United States Patent
Wu et al.

(10) Patent No.: US 8,358,501 B2
(45) Date of Patent: Jan. 22, 2013

(54) MOTHERBOARD, FAN CONTROL DEVICE, AND FAN CONTROL CIRCUIT

(75) Inventors: Kang Wu, Shenzhen (CN); Zheng-Heng Sun, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 12/954,902

(22) Filed: Nov. 28, 2010

(65) Prior Publication Data

US 2012/0099287 A1    Apr. 26, 2012

(30) Foreign Application Priority Data

Oct. 21, 2010    (CN) .......................... 2010 1 0514496

(51) Int. Cl.
*H05K 7/20* (2006.01)
(52) U.S. Cl. .................... 361/679.48; 361/781; 361/211; 361/679.46; 361/679.01; 700/300; 318/445; 318/471
(58) Field of Classification Search .................... 361/211, 361/781, 679.01, 679.46, 679.47, 679.48; 700/299, 300; 318/445, 471; 323/282, 271, 323/268

See application file for complete search history.

(56) References Cited

U.S. PATENT DOCUMENTS

| | | | |
|---|---|---|---|
| 2004/0230845 A1* | 11/2004 | Su | 713/300 |
| 2007/0153478 A1* | 7/2007 | Lu | 361/697 |
| 2008/0218140 A1* | 9/2008 | Liao et al. | 323/282 |
| 2012/0065808 A1* | 3/2012 | Liu et al. | 700/300 |

* cited by examiner

*Primary Examiner* — Hoa C Nguyen
(74) *Attorney, Agent, or Firm* — Altis Law Group, Inc.

(57) ABSTRACT

A motherboard includes a fan and a fan control circuit. The fan control circuit includes a switch module and a voltage control circuit. A first terminal of the switch module is connected to a standby power terminal of the motherboard. A second terminal of the switch module is connected to a first power terminal of the motherboard and connected to a power terminal of the fan. An input terminal of the voltage control circuit is connected to a power state signal terminal of the motherboard. An output terminal of the voltage control circuit is connected to a control terminal of the switch module. When the motherboard is turned off, the voltage control circuit turns on the switch module for a predetermined time, to make the standby power terminal supply a working voltage for the fan to keep the fan rotating for the predetermined time.

16 Claims, 4 Drawing Sheets

MOTHERBOARD, FAN CONTROL DEVICE, AND FAN CONTROL CIRCUIT

BACKGROUND

1. Technical Field

The present disclosure relates to a motherboard having a fan control device and a fan control circuit.

2. Description of Related Art

In a computer system, a central processing unit (CPU) fan is mounted on a CPU to dissipate heat from the CPU. The CPU fan is powered by the motherboard of the computer system through a connector of the CPU fan being inserted into a connector of the motherboard to receive a working voltage. When the computer system is turned off, the CPU fan is turned off and cannot dissipate heat from the CPU, however, the temperature of the CPU is still high, which leads to a reduced life of the CPU.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
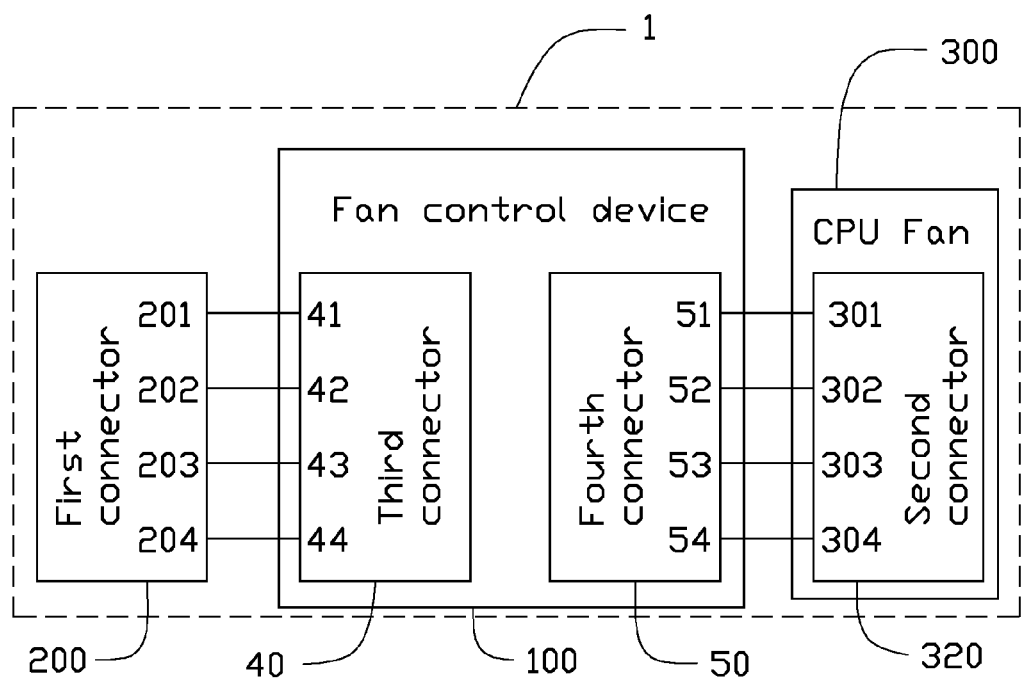
FIG. 1 is a block diagram of an exemplary embodiment of a motherboard; the motherboard includes a fan control device.

Referring to FIG. 1, an exemplary embodiment of a motherboard 1 includes a fan control device 100, a first connector 200, and a central processing unit (CPU) fan 300. The CPU fan 300 includes a second connector 320. The fan control device 100 includes a third connector 40 and a fourth connector 50. The first connector 200 includes a first voltage pin 201, a first ground pin 202, a first control pin 203, and a first detection pin 204. The first voltage pin 201 is connected to a 12 volt (V) power terminal (not shown) of the motherboard 1. The first ground pin 202 is grounded. The first detection pin 204 is connected to a fan rotation speed counter (not shown) of the motherboard 1 to detect the rotation speed of the CPU fan 300. The first control pin 203 is connected to a fan rotation speed control circuit (not shown) of the motherboard 1 to output a pulse width modulation (PWM) signal to adjust a rotation speed of the CPU fan 300. The second connector 320 includes a first voltage jack 301, a first ground jack 302, a first control jack 303, and a first detection jack 304. The third connector 40 includes a second voltage jack 41 connected to the first voltage pin 201, a second ground jack 42 connected to the first ground pin 202, a second control jack 43 connected to the first control pin 203, and a second detection jack 44 connected to the first detection pin 204. The fourth connector 50 includes a second voltage pin 51 connected to the first voltage jack 301, a second ground pin 52 connected to the first ground jack 302, a second control pin 53 connected to the first control jack 303, and a second detection pin 54 connected to the first detection jack 304. The second ground pin 52, the second control pin 53, the second detection 54 of the fourth connector 50 are respectively connected to the second ground jack 42, the second control jack 43, and the second detection jack 44 of the third connector 40.

Figure 2:
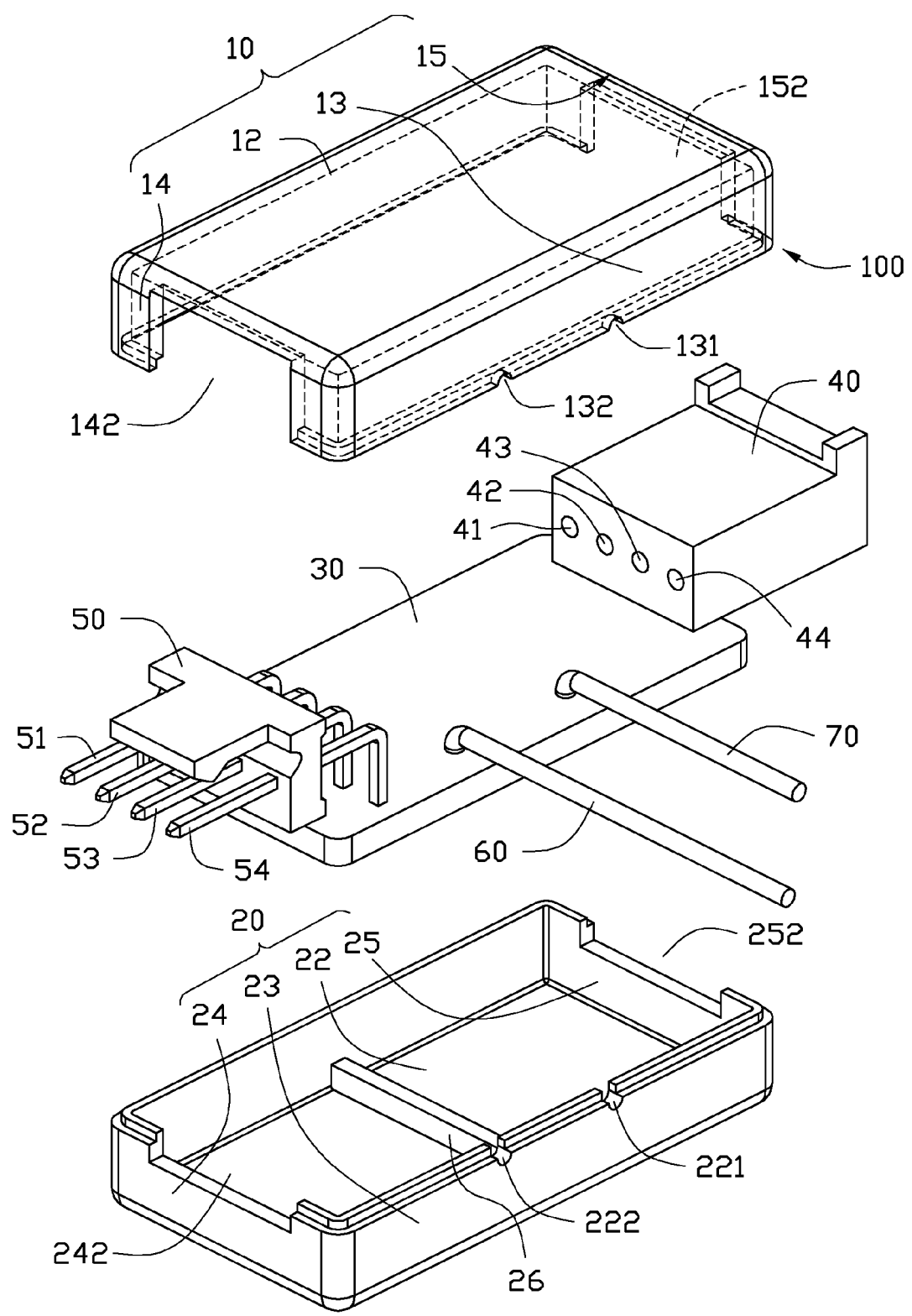
FIG. 2 is an exploded, isometric view of an exemplary embodiment of the fan control device of FIG. 1 the fan control device includes a fan control circuit.

Referring to FIG. 2, the fan control device 100 further includes an enclosure and a circuit board 30 received in the enclosure. The enclosure includes an upper cover 10 and a lower cover 20 engaged with the upper cover 10 to enclose the circuit board 30. The third and fourth connectors 40 and 50 are mounted on opposite ends of the circuit board 30.

The upper cover includes a top wall 12, two sidewalls 13 substantially perpendicularly extending down from opposite sides of the top wall 12, a front wall 14 substantially perpendicularly extending down from a first end of the top wall 12, and a back wall 15 substantially perpendicularly extending down from a second end of the top wall 12 opposite to the front wall 14. A first cutout 142 is defined in the front wall 14. A second cutout 152 is defined in the back wall 15. A hemicycle-shaped first hole 131 and a hemicycle-shaped second hole 132 are defined in a bottom of one of the sidewalls 13.

The lower cover 20 includes a bottom wall 22, two sidewalls 23 substantially perpendicularly extending up from opposite sides of the bottom wall 22, a front wall 24 substantially perpendicularly extending up from a first end of the bottom wall 22, and a back wall 15 substantially perpendicularly extending up from a second end of the top wall 22 opposite to the front wall 24. A third cutout 242 corresponding to the first cutout 142 is defined in the front wall 24. A fourth cutout 252 corresponding to the second cutout 152 is defined in the back wall 25. Hemicycle-shaped third and fourth holes 221 and 222 respectively corresponding to the first and second holes 131 and 132 are defined in a top of one of the sidewalls 23. A supporting element 26 is mounted on a top of the bottom wall 22 to support the circuit board 30.

Figure 3:
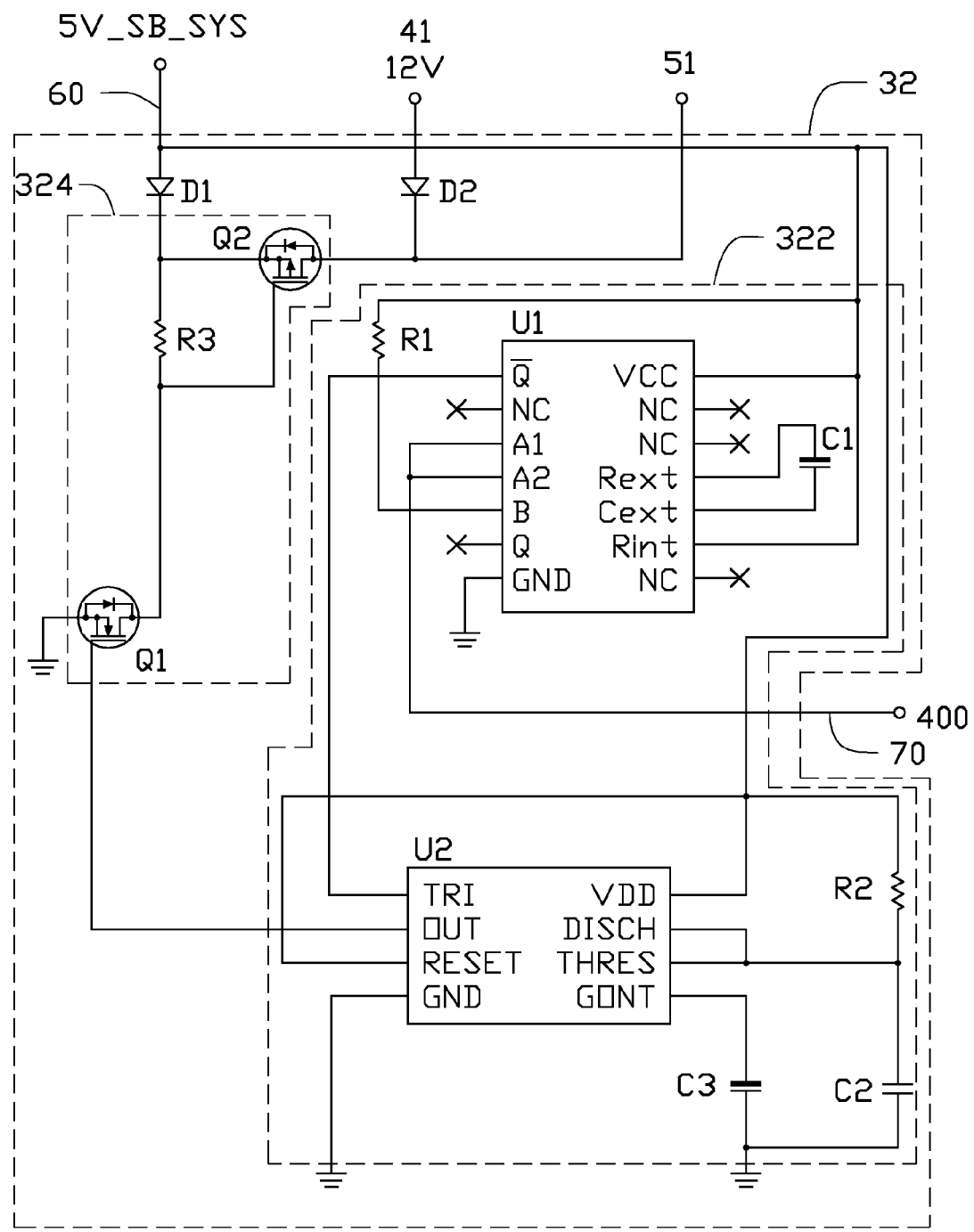
FIG. 3 is a circuit diagram of the fan control circuit of FIG. 2.

Referring to FIG. 3, a fan control circuit 32 is arranged on the circuit board 30. The fan control circuit 32 includes a first diode D1, a second diode D2, a switch module 324, and a voltage control circuit 322. The switch module 324 includes a first electrical switch Q1, a second electrical switch Q2, and a resistor R3. The voltage control circuit 322 includes a first control chip U1, a second control chip U2, resistors R1 and R2, and capacitors C1-C3. In one embodiment, the first control chip U1 is a mono-flop, and the second control chip U2 is a Schmitt trigger. In other embodiments, the first and second control chips U1 and U2 can be changed according to need.

The first control chip U1 includes a voltage pin VCC, a ground pin GND, an inner resistor pin Rint, an external resistor pin Rext, an external capacitor pin Cext, a positive trigger input pin B, two negative trigger input pins A1 and A2, and a negative pulse output pin $\overline{Q}$. The voltage pin VCC and the inner resistor pin Rint are connected to a 5V standby power terminal 5V_SB_SYS. The external resistor pin Rext is connected to the external capacitor pin Cext through the capacitor C1. The capacitor C1 and a resistor (not shown) in the first control chip U1 form a resistor-capacitor (RC) circuit to generate a pulse signal. The negative trigger input pins A1 and A2 are connected to a power state signal terminal 400 of the motherboard 1 through a cable 70. The positive trigger input pin B is connected to the voltage pin VCC through the resistor R1. The ground pin GND is grounded.

The second control chip U2 includes a trigger pin TRI, a voltage pin VDD, a reset pin RESET, a ground pin GND, an output pin OUT, a threshold pin THRES, a discharge pin DISCH, and a control voltage pin GONT. The trigger pin TRI is connected to the negative pulse output pin $\overline{Q}$ of the first control chip U1. The voltage pin VDD and the reset pin RESET are connected to the 5V standby power terminal 5V_SB_SYS through a cable 60. The ground pin GND is grounded. The control voltage pin GONT is grounded through the capacitor C3. The resistor R2 and the capacitor C2 are connected in series between the voltage pin VDD and ground to form an RC circuit to adjust a width of a pulse signal output by the second control chip U2. The threshold pin THRES and the discharge pin DISCH are connected to a node between the resistor R2 and the capacitor C2. The output pin OUT is connected to a control terminal of the first electrical switch Q1. A first terminal of the first electrical switch Q1 is grounded. A second terminal of the first electrical switch Q1 is connected to a control terminal of the second electrical switch Q2, and connected to a cathode of the first diode D1 through the resistor R3. An anode of the first diode D1 is connected to the 5V standby power terminal 5V_SB_SYS through the cable 60. A first terminal of the second electrical switch Q2 is connected the cathode of the first diode D1. A second terminal of the second electrical switch Q2 is connected to a cathode of the second diode D2, and connected to the voltage pin 51 of the fourth connector 50. An anode of the second diode D2 is connected to the voltage jack 41 of the third connector 40 to receive the 12V voltage from the motherboard 1.

Figure 4:
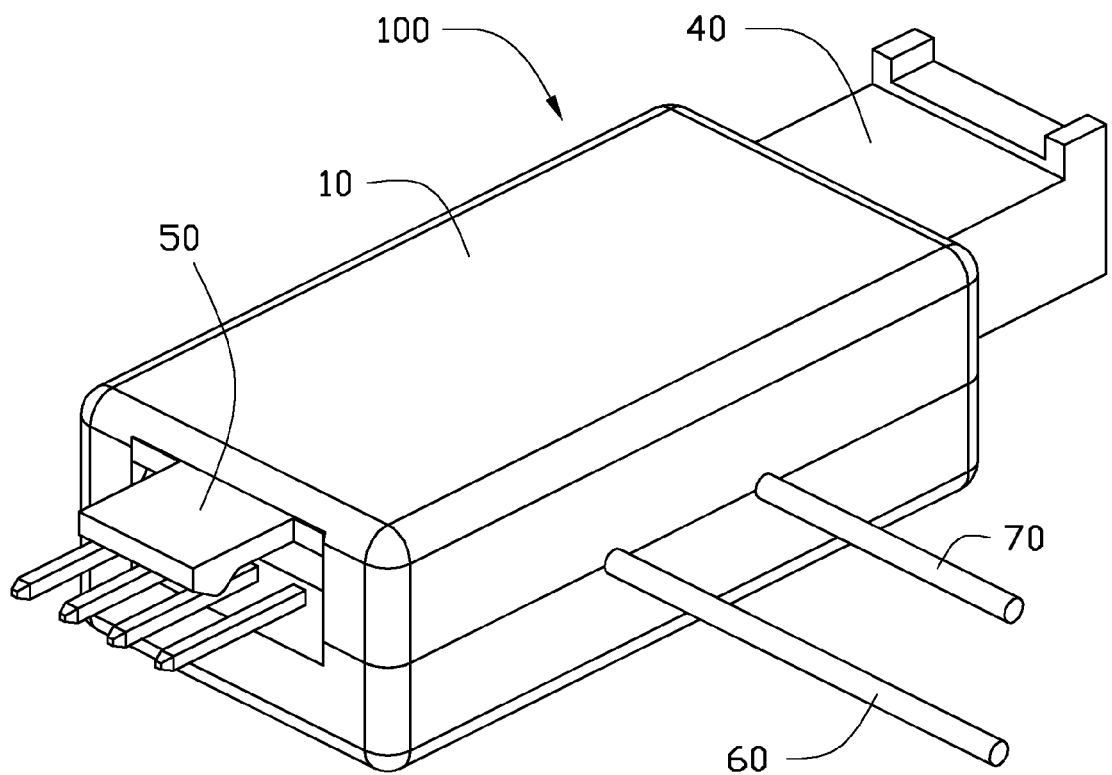
FIG. 4 is an assembled, isometric view of the fan control device of FIG. 2.

Referring to FIG. 4, in assembly, the circuit board 30 is received in the lower cover 20, and supported on the supporting element 26. The fourth connector 50 is exposed through the third cutout 242 of the front wall 24 of the lower cover 20. The third connector 40 is exposed through the fourth cutout 252 of the back wall 25 of the lower cover 20. The cable 60 is exposed through the fourth hole 222 of the lower cover 20. The cable 70 is exposed through the third hole 221 of the lower cover 20. The upper cover 10 is engaged with the lower cover 20 to cover the circuit board 30.

In use, the fourth connector 50 of the fan control device 100 is engaged with the second connector 320, and the third connector 40 of the fan control device 100 is engaged with the first connector 220. When the motherboard 1 is at a power-on state, the power state signal terminal 400 outputs a high level signal to the two input pins A1 and A2 of the first control chip U1 (see FIG. 3). Owing to the two pins A1 and A2 receiving the high level signal, the first control chip U1 does not work, and does not output any signals to the second control chip U2. The second control chip U2 fails to be triggered. The first electrical switch Q1 is turned off. The second electrical switch Q2 is turned off. The second diode D2 is turned on because the anode receiving the 12V voltage from the motherboard 1. The 12V voltage is output to the voltage pin 51 of the fourth connector 50 to supply a working voltage to the CPU fan 300, to keep the CPU fan 300 rotating to dissipate heat from the CPU.

When the motherboard is turned off, the motherboard fails to output the 12V voltage. The second diode D2 is turned off. The signal output by the power state signal terminal 400 changes from a high level to a low level, because the two input pins A1 and A2 receive the signal, which changes from the high to the low level, the first control chip U1 is triggered. The output pin $\overline{Q}$ of the first control chip U1 outputs a negative pulse. The second control chip U2 is triggered. The second control chip U2 outputs a high level signal to the control terminal of the first electrical switch Q1. The first electrical switch Q1 is turned on. The second electrical switch Q2 is turned on. The 5V standby voltage from the motherboard 200 is supplied for the voltage pin 51 of the fourth connector 50 through the first diode D1 and the second electrical switch Q2, to keep the CPU fan 300 working to dissipate heat from the CPU.

In the embodiment, the resistor R2 and the capacitor C2 form the RC circuit to control the pulse width of the pulse signal output by the second control chip U2, to further control the turn-on time of the first electrical switch Q1. Therefore, the time of dissipating heat for the CPU can be controlled.

In other embodiments, the time of dissipating heat from the CPU can be adjusted by adjusting the resistance of the resistor R2 and the capacitance of the capacitor C2. The fan control circuit 32 can be mounted on the motherboard 1 directly. The disclosure can be used to control other fans.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A motherboard, comprising:
a fan; and
a fan control device comprising:
  a fan control circuit comprising:
    a switch module comprising a first terminal connected to a standby power terminal of the motherboard, a second terminal connected to a first power terminal of the motherboard to receive a first voltage and connected to a power terminal of the fan, and a control terminal; and
    a voltage control circuit comprising an input terminal connected to a power state signal terminal of the motherboard to receive a power state signal, and an output terminal connected to the control terminal of the switch module;
  wherein when the motherboard is turned off, the voltage control circuit turns on the switch module for a predetermined time according to the power state signal, to make the standby power terminal supply a working voltage for the fan to keep the fan rotating for the predetermined time.

2. The motherboard of claim 1, wherein the voltage control circuit comprises a first control chip, a second control chip, a first resistor, a first capacitor, and a second capacitor, the first control chip comprises two input pins, a first output pin, an external resistor pin, and an external capacitor pin, the second control chip comprises a triggering pin, a second output pin, a threshold pin, and a discharging pin, the input pins of the first control chip function as the input terminal of the voltage control circuit, the first output pin is connected to the triggering pin, the first capacitor is connected between the external resistor pin and the external capacitor pin, the first resistor and the second capacitor are connected in series between the standby power terminal of the motherboard and ground, the threshold pin and the discharging pin are connected to a node between the first resistor and second capacitor, the second output pin is connected to the control terminal of the switch module, wherein when the motherboard is turned off, the power state signal triggers the first control chip to trigger the second control chip to turn on the switch module.

3. The motherboard of claim 1, wherein the switch module comprises a first electrical switch and a second electrical switch, a control terminal of the first electrical switch functions as the control terminal of the switch module, a first terminal of the first electrical switch is grounded, a second terminal of the first electrical switch is connected to a control terminal of the second electrical terminal, and connected to a first terminal of the second electrical switch through a resistor, the first terminal of the second electrical switch is connected to the standby power terminal, a second terminal of the second electrical switch functions as the second terminal of the switch module.

4. The motherboard of claim 3, wherein the fan control circuit further comprises a first diode and a second diode, an anode of the first node is connected to the standby power terminal, a cathode of the first diode is connected to the first terminal of the second electrical switch, an anode of the second diode is connected to the first power terminal, a cathode of the second diode is connected to the second terminal of the second electrical switch.

5. The motherboard of claim 4, further comprising a first connector, wherein the fan comprises a second connector, the fan control device further comprises a circuit board, a third connector, and a fourth connector, wherein the third and fourth connector, the first and the second control chips, the first and second electrical switches, the first and second diode, the first and second resistors, and the first and second capacitor are mounted on the circuit board, wherein when the fourth connector is engaged with the second connector, the second terminal of the second electrical switch is connected to the power terminal of the fan through the fourth and second connectors, when the third connector is engaged with the first connector, the anode of the second diode is connected to the first power terminal of the motherboard through the first and third connectors.

6. The motherboard of claim 5, wherein the fan control device further comprises an enclosure, a first through hole and a second through hole are defined in opposite ends of the enclosure, the circuit board is received in the enclosure, the third connector is exposed through the first through hole to connect to the first connector, the fourth connector is exposed through the second through hole to connect to the second connector.

7. The motherboard of claim 6, wherein the enclosure comprises an upper cover and a lower cover covered on the upper cover, the upper cover comprises a top wall, two first sidewalls extending down from opposite sides of the top wall, a first front wall extending down from a first end of the top wall, and a first back wall extending down from a second end of the top wall opposite to the first front wall, a first cutout is defined in the first front wall, a second cutout is defined in the first back wall, the lower cover comprises a bottom wall, two second sidewalls extending up from opposite sides of the bottom wall, a second front wall extending up from a first end of the bottom wall, and a second back wall extending up from a second end of the top wall opposite the second front wall, a third cutout corresponding to the first cutout is defined in the second front wall, a fourth cutout corresponding to the second cutout is defined in the second back wall, the first cutout and the third cutout communicate to form the first through hole, the second cutout and the fourth cutout communicate to form the second through hole.

8. The motherboard of claim 5, wherein the third connector comprises a voltage jack, a ground jack, a detection jack, and a control jack, the fourth connector comprises a voltage pin, a ground pin connected to the ground jack, a detection pin connected to the detection jack, and a control pin connected to the control jack, wherein the ground pin, the detection pin, and the control pin of the third connector are connected to the ground jack, detection jack, and the control jack of the first connector, wherein the ground jack, the detection jack, and the control jack of the fourth connector are connected to the ground pin, the detection pin, and the control pin of the second connector respectively, the voltage jack of the third connector is connected to the first power terminal of the motherboard through the first connector, the voltage pin of the fourth connector is connected to the power terminal of the fan through the voltage jack of the second connector.

9. A fan control device to control a fan to continue rotating after a motherboard being turned off, the fan control device comprising:
a circuit board;
a first connector arranged on the circuit board to connect to a second connector of the motherboard;
a third connector mounted on the circuit board to connect to a fourth connector of the fan; and
a fan control circuit mounted on the circuit board, the fan control circuit comprising:
a switch module comprising a first terminal connected to a standby power terminal of the motherboard, a second terminal connected to the first connector to receive a first voltage from the motherboard and connected to the third connector, and a control terminal; and
a voltage control circuit comprising an input terminal connected to a power state signal terminal of the motherboard to receive a power state signal, and an output terminal connected to the control terminal of the switch module;
wherein when the motherboard is turned off, the voltage control circuit turns on the switch module for a predetermined time according to the power state signal, to make the standby power terminal supply a working voltage to the fan to keep the fan rotating for the predetermined time.

10. The fan control device of claim 9, wherein the fan control device further comprises an enclosure, a first through hole and a second through hole are defined in opposite ends of the enclosure, the circuit board is received in the enclosure, the first connector is exposed through the first through hole to connect to the second connector, the third connector is exposed through the fourth through hole to connect to the fourth connector.

11. The fan control device of claim 10, wherein the enclosure comprises an upper cover and a lower cover covered on the upper cover, the upper cover comprises a top wall, two first sidewalls extending down from opposite sides of the top wall, a first front wall extending down from a first end of the top wall, and a first back wall extending down from a second end of the top wall opposite to the first front wall, a first cutout is defined in the first front wall, a second cutout is defined in the first back wall, wherein the lower cover comprises a bottom wall, two second sidewalls extending up from opposite sides of the bottom wall, a second front wall extending up from a first end of the bottom wall, and a second back wall extending up from a second end of the top wall opposite to the second front wall, a third cutout corresponding to the first cutout is defined in the second front wall, a fourth cutout corresponding to the second cutout is defined in the second back wall, the first cutout and the third cutout communicate to form the first through hole, the second cutout and the fourth cutout communicate to form the second through hole.

12. The fan control device of claim 9, wherein the first connector comprises a voltage jack, a ground jack, a detection jack, and a control jack, the third connector comprises a voltage pin, a ground pin connected to the ground jack, a detection pin connected to the detection jack, and a control pin connected to the control jack, the ground pin, the detection pin and the control pin of the third connector are inserted into the ground jack, detection jack, and control jack of the fourth connector, the ground jack, the detection jack, and the control jack of the first connector are connected to the ground pin, the detection pin, and the control pin of the second connector respectively, the voltage jack of the first connector is connected to the first power terminal of the motherboard through the second connector, the voltage pin of the third connector is connected to the power terminal of the fan through the voltage jack of the fourth connector.

13. A fan control circuit to control a fan to continue rotating after a motherboard being turned off, the fan control circuit comprising:

a switch module comprising a first terminal connected to a standby power terminal of the motherboard, a second terminal connected to the a first power terminal of the motherboard to receive a first voltage and connected to the power terminal of the fan, and a control terminal; and a voltage control circuit comprising an input terminal to connect to a power state signal terminal of the motherboard to receive a power state signal, and an output terminal connected to the control terminal of the switch module;

wherein when the motherboard is turned off, the voltage control circuit turns on the switch module for a predetermined time according to the power state signal, to make the standby power terminal supply working voltage to the fan to keep the fan rotating for the predetermined time.

14. The fan control circuit of claim 13, wherein the voltage control circuit comprises a first control chip, a second control chip, a first resistor, a first capacitor, and a second capacitor, the first control chip comprises two input pins, a first output pin, an external resistor pin, and an external capacitor pin, the second control chip comprises a triggering pin, a second output pin, a threshold pin, and a discharging pin, wherein the input pins function as the input terminal of the voltage control circuit, the first output pin is connected to the triggering pin, the first capacitor is connected between the external resistor pin and the external capacitor pin, the first resistor and the second capacitor are connected in series between the standby power terminal of the motherboard and ground, the threshold pin and the discharging pin are connected to a node between the first resistor and second capacitor, the second output pin is connected to the control terminal of the switch module, wherein when the motherboard is turned off, the power state signal triggers the first control chip to trigger the second control chip to turn on the switch module.

15. The fan control circuit of claim 13, wherein the switch module comprises a first electrical switch and a second electrical switch, a control terminal of the first electrical switch functions as the control terminal of the switch module, a first terminal of the first electrical switch is grounded, a second terminal of the first electrical switch is connected to a control terminal of the second electrical terminal, and connected to a first terminal of the second electrical switch through a second resistor, the first terminal of the second electrical switch is connected to the standby power terminal, a second terminal of the second electrical switch functions as the second terminal of the switch module.

16. The fan control circuit of claim 15, further comprising a first diode and a second diode, wherein an anode of the first node is connected to the standby power terminal, a cathode of the first diode is connected to the first terminal of the second electrical switch, an anode of the second diode is connected to the first power terminal, a cathode of the second diode is connected to the second terminal of the second electrical switch.

* * * * *